United States Patent [19]
Sklar et al.

[11] Patent Number: 5,790,175
[45] Date of Patent: Aug. 4, 1998

[54] AIRCRAFT SATELLITE TELEVISION SYSTEM FOR DISTRIBUTING TELEVISION PROGRAMMING DERIVED FROM DIRECT BROADCAST SATELLITES

[75] Inventors: Richard E. Sklar, Huntington Beach; Lawrence E. Girard, Westminster; Ralph P. Phillipp, Huntington Beach; David C. Frankenbach, La Habra Heights; Dickey J. Berry, La Verne; Jim C. Williams, Anaheim, all of Calif.

[73] Assignee: Hughes Aircraft Company, Los Angeles, Calif.

[21] Appl. No.: 667,222

[22] Filed: Jun. 19, 1996

[51] Int. Cl.$^6$ ........................................... H04N 7/16
[52] U.S. Cl. ................ 348/8; 455/6.3; 342/363; 343/757
[58] Field of Search ................ 348/8, 6, 7, 12, 348/13, 14, 15, 16, 17, 18, 10, 11; 455/4.2, 4.1, 5.1, 6.1, 6.2, 6.3, 289, 293, 3, 2; 343/707, 706, 705, 708, 757, 763; 342/363, 365, 372, 359; H04N 7/16, 7/173, 7/20

[56] References Cited

U.S. PATENT DOCUMENTS

| | | | |
|---|---|---|---|
| 3,972,045 | 7/1976 | Perret | 343/705 |
| 4,392,139 | 7/1983 | Aoyama et al. | 343/705 |
| 4,958,381 | 9/1990 | Toyoshima | 348/8 |
| 5,146,234 | 9/1992 | Lalezari | 343/895 |
| 5,311,302 | 5/1994 | Berry et al. | 348/14 |
| 5,463,656 | 10/1995 | Polivka et al. | 375/200 |
| 5,495,258 | 2/1996 | Mulhauser et al. | 343/753 |
| 5,524,272 | 6/1996 | Podowski | 455/3.2 |
| 5,555,466 | 9/1996 | Scribner et al. | 348/8 |
| 5,568,484 | 10/1996 | Margis | 348/8 |
| 5,583,735 | 12/1996 | Pease et al. | 361/170 |

FOREIGN PATENT DOCUMENTS

570198 A2  11/1993  European Pat. Off. ......... H04N 7/22

*Primary Examiner*—Christopher C. Grant
*Attorney, Agent, or Firm*—G. S. Grunebach; M. W. Sales; W. K. Denson-Low

[57] ABSTRACT

A system that provides live television programming to passengers by integrating direct broadcast satellite services into an in-flight aircraft entertainment system. The present invention is a satellite television system that has an antenna disposed on the aircraft that is pointed at a plurality of satellites that are part of a direct broadcast satellite system. The antenna is controlled by an antenna controller and antenna interface unit that send control signals and process status signals to steer the antenna. The antenna is steered to lock it onto RF signals transmitted by the satellites. The antenna interface unit downconverts the received RF signals to provide left hand circularly polarized RF signals and right hand circularly polarized RF signals that contain different sets of television channels. The downconverted RF signals are processed by a receiver/decoder that decodes them to provide video signals corresponding to different television channels. The video signals for the different channels are routed to an video and audio distribution system on the aircraft which distributes live television programming to the passengers. A low-cost single channel receiver/decoder version of the system is also disclosed that provides a single channel of television programming to overhead monitors in an aircraft.

14 Claims, 3 Drawing Sheets

5,790,175

AIRCRAFT SATELLITE TELEVISION SYSTEM FOR DISTRIBUTING TELEVISION PROGRAMMING DERIVED FROM DIRECT BROADCAST SATELLITES

BACKGROUND

The present invention relates generally to in-flight aircraft entertainment systems, and more particularly, to satellite television systems that provide live in-flight television programming to passengers of an aircraft by way of direct broadcast satellite.

The assignee of the present invention manufactures in-flight aircraft entertainment systems, such as an APAX-150 digital passenger entertainment system, for example. The APAX-150 system, along with other commercially available systems, distributes audio and video material to passengers derived from a variety of sources. For example, existing aircraft passenger entertainment systems provide passengers with audio generated from audio tape players, movies derived from video tape players, and interactive services such as games, shopping and telecommunications. With the exception of telecommunication services (air-to-ground telephone calls, etc), all existing services utilize on-board sources (tape players, etc.) to provide the viewable content.

According to polls of airline passengers, there is strong interest in live television programming as an entertainment option. This may include news, sporting events, movies and regular commercial programming. Up to now, each airplane has been a closed, self-contained content provider, in the sense that once off the ground, all entertainment is generated from within the aircraft. This has precluded the offering of live television. Now, with the advance in live broadcast satellite technology, it is possible to provide this desired service to the flying passenger.

An article was published by Jim C. Williams entitled "Airborne Satellite Television" published in the Fourth Quarter 1994 issue of Avion magazine at pages 43–54 that generally describes broadcasting of television programming to aircraft by way of satellites. Another article in that magazine entitled "MPEG The Great Enabler" describes MPEG compression technology which is used in the DirecTV digital broadcast satellite system to transmit multiple video and audio channels from a ground station to satellite transponders which relay them to ground-based receivers where they are decoded and displayed. These articles are incorporated herein by reference in their entirety.

The articles provide a description of the digital broadcast satellite system and its operation. The Airborne Satellite Television article also describes adapting the digital broadcast satellite system to provide live television broadcasts to aircraft. However, while a description is provided regarding a possible system that could be implemented and the problems that needed to be overcome to implement such a system were discussed, no details of an actual system were provided, such as system or component block diagrams, for example. In fact, the article states that a working system was to be developed in the future. The present invention is such a system.

Accordingly, it is an objective of the present invention to provide for satellite television systems that provide live in-flight television programming to aircraft passengers. It is a further objective of the present invention to provide for satellite television systems that provide live television programming to passengers that is derived from direct broadcast satellites.

SUMMARY OF THE INVENTION

To meet the above and other objectives, the present invention is a satellite television system that provides live television programming to passengers by integrating direct broadcast satellite (DBS) services into currently available in-flight aircraft entertainment systems. The present invention combines direct broadcast satellite and audio and video entertainment technologies for the first time, to provide aircraft passengers with live in-flight television programming.

More specifically, the satellite television system comprises an antenna that is disposed on the aircraft and pointed at a plurality of satellites that are part of a direct broadcast satellite system. The antenna is controlled by an antenna controller and antenna interface unit that send control signals and process status signals to steer the antenna. The antenna is steered so that it is locked onto RF signals transmitted by the satellite. The antenna interface unit downconverts the received RF signals to provide left hand circularly polarized RF signals and right hand circularly polarized RF signals that contain different sets of television channels.

The downconverted RF signals are decoded by a receiver/decoder to provide video signals corresponding to a plurality of television channels. The video signals for the plurality of channels are routed to a video and audio distribution system on the aircraft which distributes live television programming to the passengers. A low-cost single receiver/decoder version of the system is also disclosed that provides a single channel of video and audio television programming to overhead monitors in an aircraft.

The present invention may be implemented with any in-flight distributed video system, whether it is interactive or not. It is equally applicable to systems where video is shown on overhead monitors wherein each passenger views the same program, and to systems where each passenger has an individual in-seat video monitor and can select from a number of available programs.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
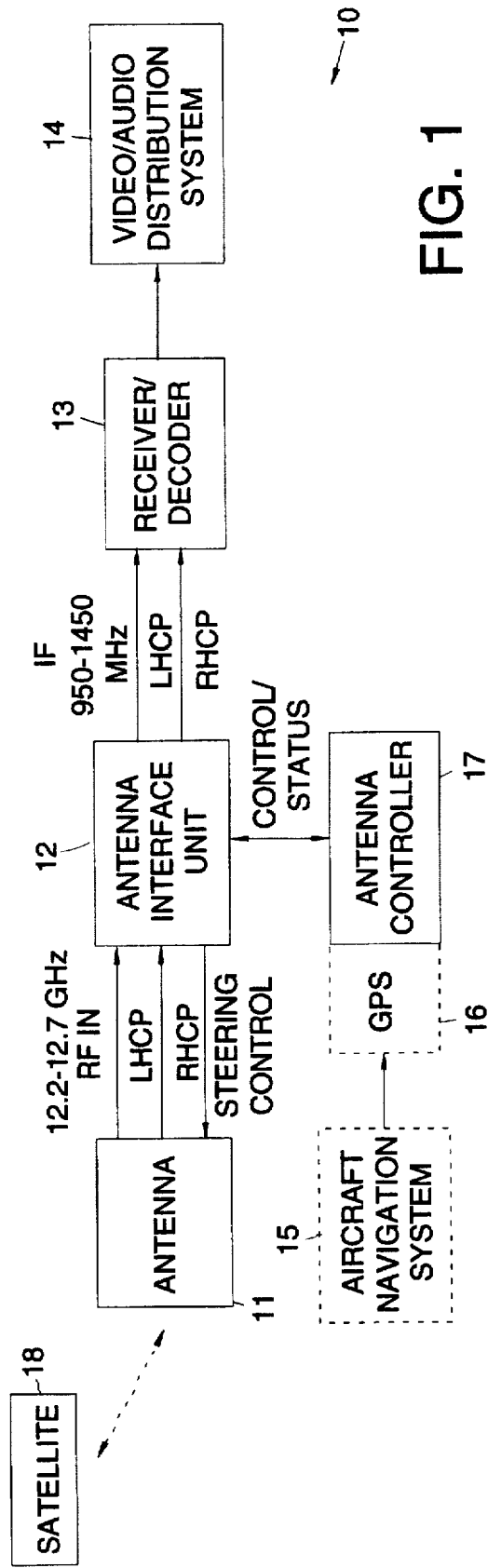
FIG. 1 is a top level block diagram of a first embodiment of a satellite television system in accordance with the principles of the present invention that provides live inflight television programming for aircraft passengers.

Referring to the drawing figures, FIG. 1 shows a top level block diagram of a first embodiment of a satellite television system 10 in accordance with the principles of the present invention. The satellite television system 10 provides live television programming for passengers in an aircraft. The satellite television system 10 comprises an antenna 11 that is disposed adjacent the surface of the aircraft. The antenna 11 is pointed at satellites 18, such as DirectTV satellites 18, for example, that are part of the existing DirectTV direct broadcast satellite (DBS) system. The antenna 11 is steered so that it is locked onto the RF signal transmitted by the satellite 18. The antenna 11 is controlled by an antenna controller 17 that sends control signals and processes status signals to and from the antenna 11 by way of an antenna interface unit 12. However, it is to be understood that the antenna 11 may be an electronically steered antenna 11 or a mechanically steered antenna 11.

The antenna interface unit 12 downconverts the received RF signals to provide left hand circularly polarized RF signals and right hand circularly polarized RF signals that contain different sets of television channels. The received RF signals are in the 12.2–12.7 GHz band which are downconverted to IF signals in the 950–1450 MHz band. The downconverted IF signals are processed by a receiver/decoder 13 which decodes them to provide video signals corresponding to a plurality of television channels. The video signals for the various channels are then routed to a conventional video and audio distribution system 14 on the aircraft which distributes live television programming to the passengers. The receiver/decoder 13 may generate either baseband video and analog audio, or digitally compressed video and audio depending on the nature of the distribution system 14.

Figure 2:
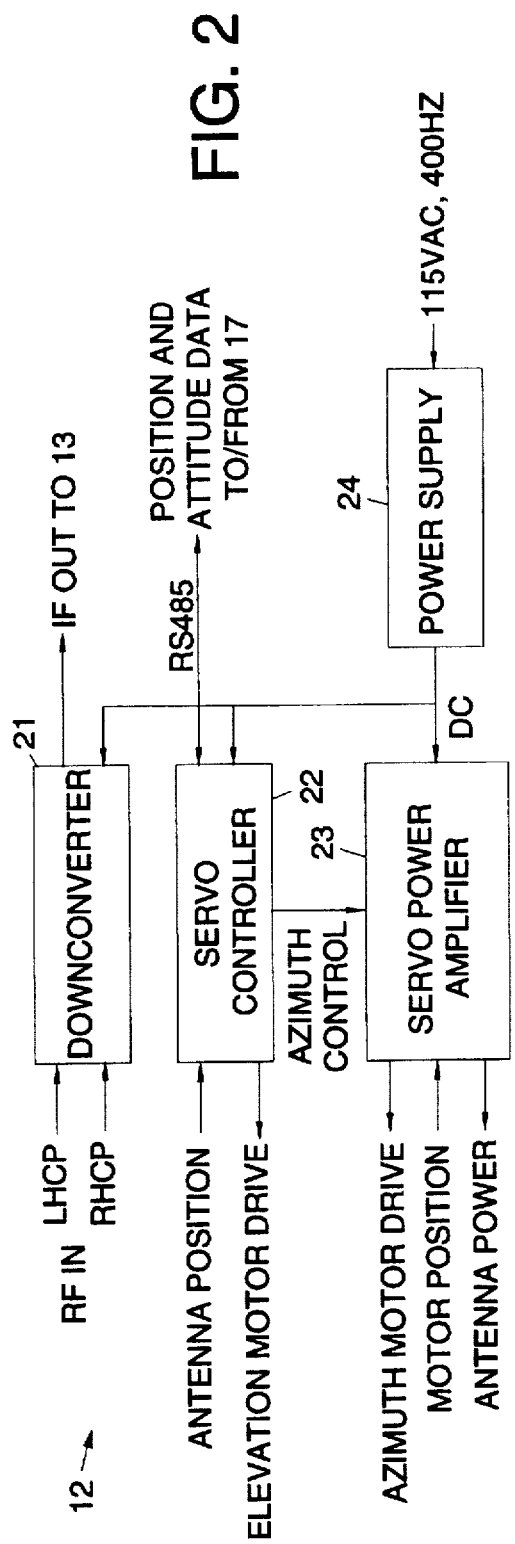
FIG. 2 is a block diagram of an antenna interface unit employed in the system of FIG. 1.

Referring to FIG. 2, it shows a block diagram of one embodiment of the antenna interface unit 12 employed in the system of FIG. 1. The antenna interface unit 12 comprises a downconverter 21 that downconverts the RF signals from the 12.2–12.7 GHz band to the 950–1450 MHz band which are output to the receiver/decoder 13. A servo controller 22 is coupled between the antenna controller 17 and the antenna 11. The servo controller 22 processes antenna position signals to generate elevation motor drive signals that are supplied to the antenna 11. The servo controller 22 also outputs azimuth control signals to a servo power amplifier 23 that generates azimuth motor drive signals that are supplied to the antenna 11. Motor position signals are fed from the antenna 11 to the servo power amplifier 23. Power is supplied to the antenna 11 by the servo power amplifier 23. A power supply 24 is provided that converts 115 volt AC power into appropriate DC voltages for the downconverter 21, the servo controller 22 and the servo power amplifier 23.

Figure 3:
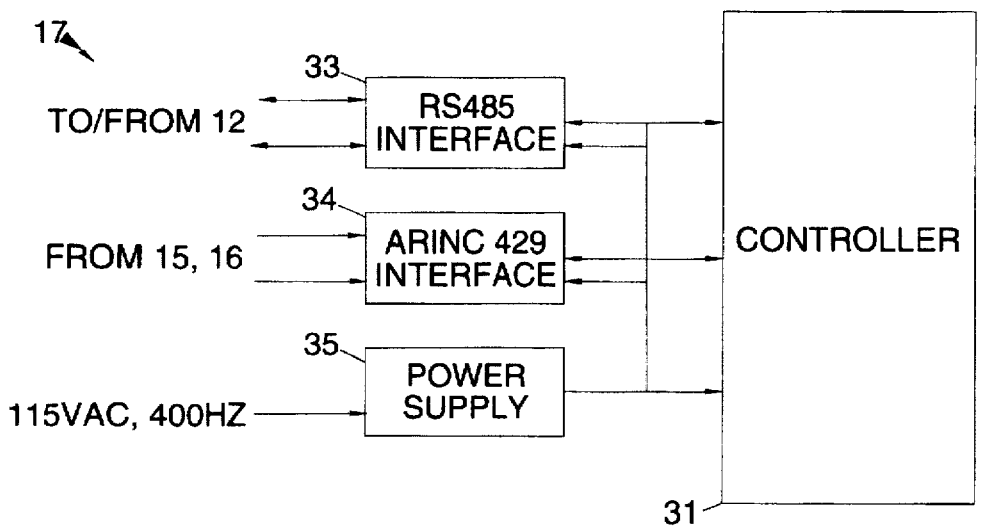
FIG. 3 is a block diagram of an antenna controller employed in the system of FIG. 1.

Referring to FIG. 3, it shows a block diagram of the antenna controller 17 employed in the system 10 of FIG. 1. The antenna controller 17 comprises a controller 31 that is coupled to an RS485 interface 33 and an ARINC 429 interface 34. A power supply 35 is provided that converts 115 volt AC power into appropriate DC voltages for the controller 31, the RS485 interface 33, and the ARINC 429 interface 34. The controller 31 may be an Intel 486 processor, for example. The RS485 interface 33 is coupled between the antenna interface unit 12 and the controller 31 and couples control and status signals thereto. The ARINC 429 interface 34 is coupled between the aircraft navigation system 15 or global positioning system (GPS) 16 and the controller 31 and couples inertial reference signals thereto which is used to accurately steer the antenna 11 toward the satellite 18.

Figure 4:
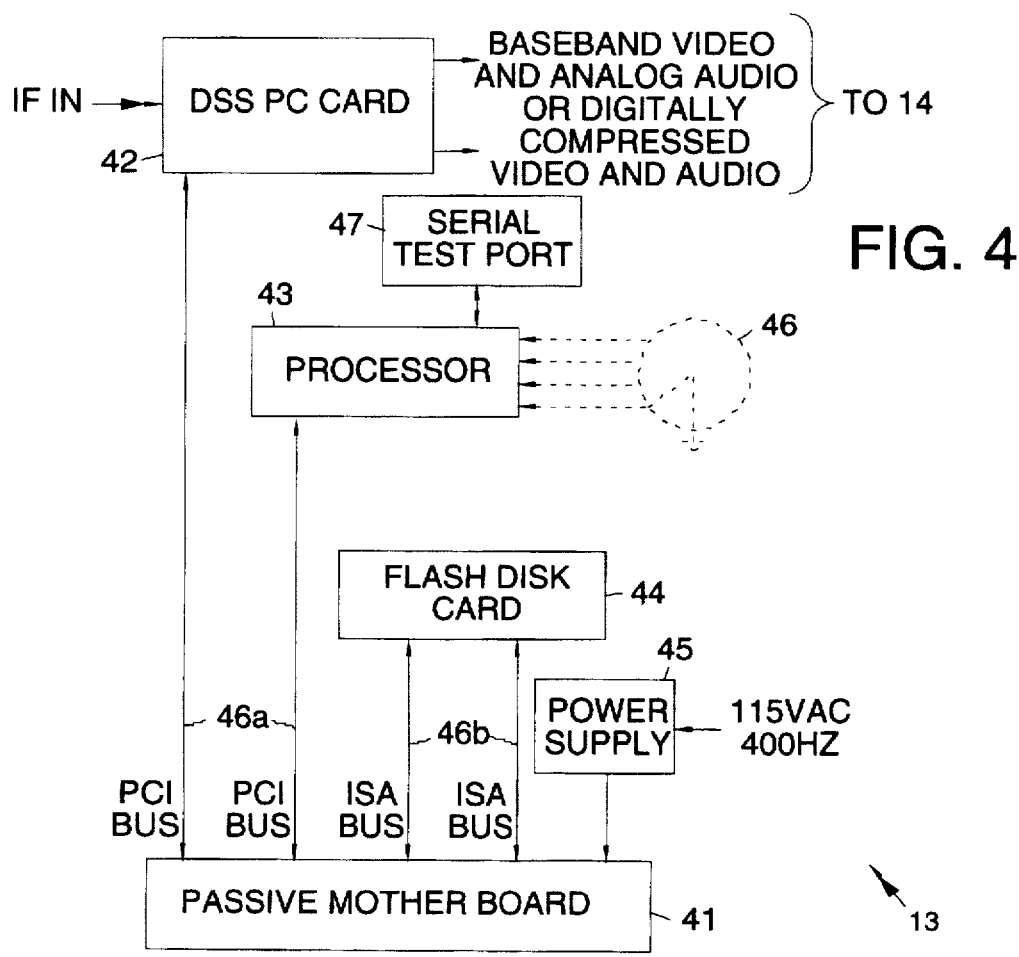
FIG. 4 is a block diagram of an receiver/decoder employed in the system of FIG. 1.

Referring to FIG. 4, it shows a block diagram of the receiver/decoder 13 employed in the system of FIG. 1. The receiver/decoder 13 comprises a passive mother board 41 which has PCI and ISA busses 46a, 46b. A DSS PC card 42, for example, available from Hughes Network Systems and a computer processor 43 are coupled to the PCI bus 46a. The DSS PC card 42 and the computer processor 43 contain electronics and software that are substantially identical to a receiver/decoder that is used in commercially available DSS systems, such as those made by RCA, for example. Thus, the DSS PC card 42 and the computer processor 43 perform the functions of the receiver/decoder 13.

The computer processor 43 may be coupled to a rotary switch 46, for example, that is used to select a channel for viewing. The computer processor 43 also has a serial test port 47 that may be used to test the processor 43 and DSS PC card 42. A flash disk card 44 is coupled to the ISA bus 46b and is used to store data and code in a manner similar to a hard disk. A power supply 45 is coupled to the passive mother board 41 and is used to convert 115 volt AC power into appropriate DC voltages for the DSS PC card 42, the computer processor 43, and the flash disk card 44.

In operation, the antenna 11 is appropriately steered to lock onto the satellites 18, and television signals are received on the aircraft for distribution to its passengers. The antenna 11 tracks the satellites 18 using the antenna controller 17, the antenna interface unit 12 and servo motors on the antenna 11. The antenna 11 tracks the satellites 18 by means of electronic or mechanical steering (or a combination of both), and in both azimuth and elevation directions. To accomplish this, the system 10 uses information regarding the location of the satellites 18 and the location and attitude of the aircraft. This information is provided by the aircraft navigation system 15 or via a navigational system 16 such as the GPS receiver 16. The antenna interface unit 12 provides control signals to the steering circuits within the antenna 11, whether electronic or mechanical. The antenna controller 17 commands the antenna interface unit 12 where to point the antenna 11 based on the location and attitude of the aircraft. In the disclosed embodiment, steering control is partitioned to use the antenna controller 17 and the antenna interface unit 12, but in other embodiments, a single controller 17 may be used.

Once the antenna 11 is pointed at the satellites 18, its RF output signal (approximately 12 GHz) is downconverted to approximately 1 GHz in the antenna interface unit 12. This signal is applied to the receiver/decoder 13 where it is appropriately processed and made available to the video and audio distribution system 14. The nature of the video and audio distribution system 14 in the aircraft determines the format of the output of the receiver/decoder 13, which may be analog or digital, and if it is digital, whether it is encoded or decoded.

Figure 5:
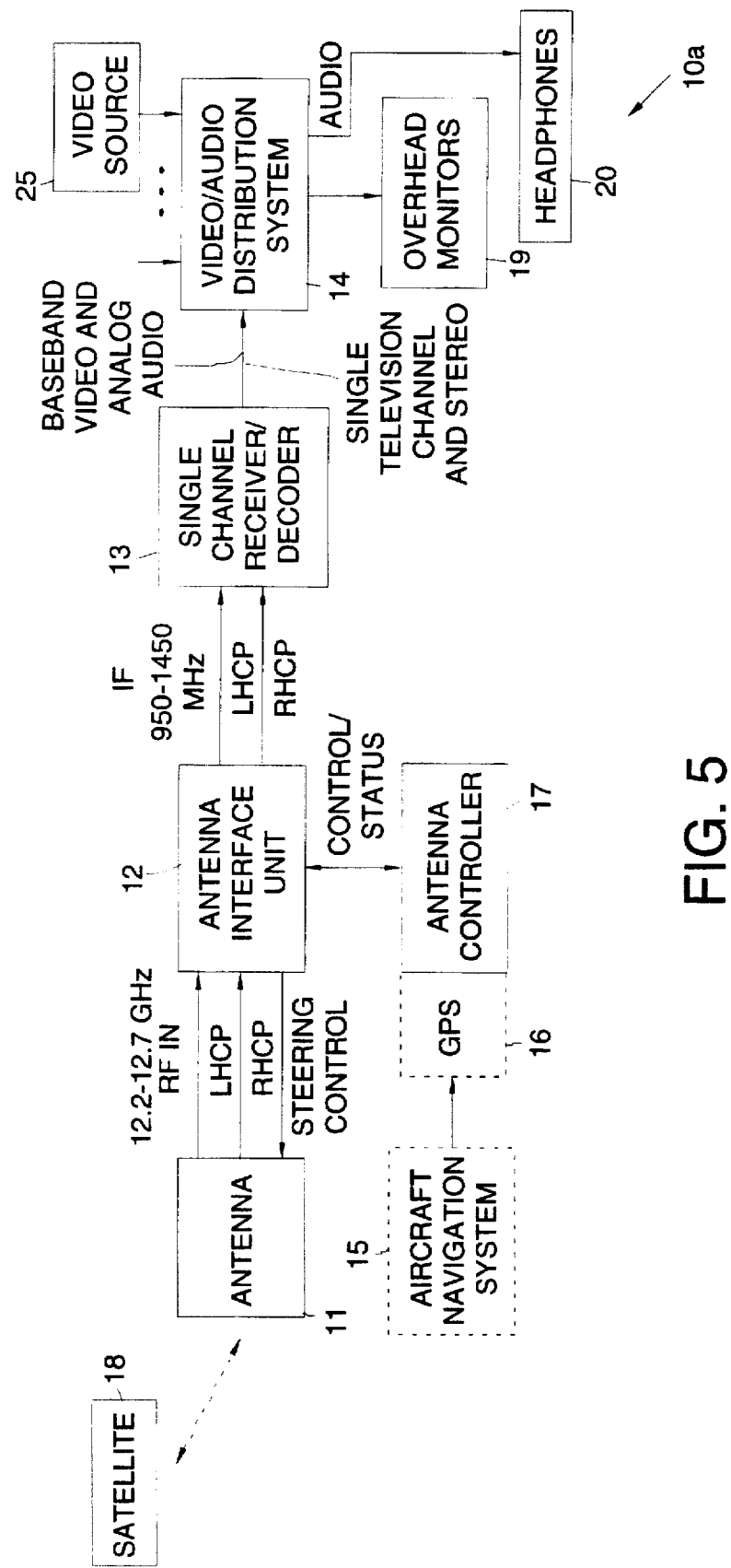
FIG. 5 is a block diagram of a second embodiment of a satellite television system in accordance with the principles of the present invention.

Referring now to FIG. 5, it shows a block diagram of a second embodiment of a satellite television system 10a in accordance with the principles of the present invention. The system 10a of FIG. 5 provides for low-cost distribution of live television programming to overhead monitors 19 in an aircraft. This embodiment specifically addresses case of distribution of live television programming within an aircraft where the programming is viewed on overhead monitors 19 mounted throughout the aircraft. In this case, a single television program is viewed by all passengers at the same time. Consequently, this system 10a provides for a low-cost solution to the general distribution case described with reference to the system 10 of FIG. 1.

The system 10a is suitable for aircraft that show video material on overhead monitors 19 mounted throughout the aircraft. Current systems of this type use the overhead monitors 19 to display movies from an on-board video tape player 25. Audio is distributed to each passenger's headphones 20. The system 10a of FIG. 5 provides for low-cost distribution of a single live television program, thus allowing an airline to add this feature without installing a costly upgraded distribution system 14. This embodiment may be implemented in any in-flight distribution system 14 where a single program is presented on overhead monitors 19 mounted throughout the aircraft.

In the embodiment of FIG. 5, the receiver/decoder 13 outputs a single channel of live television which comprises one video output and one audio output. The receiver/decoder 13 receives the IF signal from the antenna interface unit 12, extracts the desired channel, decodes this data and generates baseband video and analog audio output signals. The decoding process that is employed depends upon the type of encoding that is used at the ground-based program source, which may be MPEG compression, for example.

Only a single-channel receiver/decoder 13 is required, since in this low-cost application, only one television program is shown at a time. The receiver/decoder 13 used in the system 10a disclosed with reference to FIG. 4 employs a rotary switch or other means to select one television channel. The baseband video and analog audio output signals from the receiver/decoder 13 are in the same format as those of the video tape player 25, for example, so that it is entirely compatible with the existing distribution system 14. Therefore, the satellite television system 10a can coexist with other video and audio sources on the aircraft, such as video and audio tape players, for example. The flight crew selects one of the video and audio sources since only one source can be displayed on the overhead monitors 19 at a given time.

Thus, satellite television systems that provide live television programming to passengers that is derived from direct broadcast satellites have been disclosed. It is to be understood that the described embodiments are merely illustrative of some of the many specific embodiments which represent applications of the principles of the present invention. Clearly, numerous and varied other arrangements may be readily devised by those skilled in the art without departing from the scope of the invention.

What is claimed is:

1. A satellite television system that provides live television programming to passengers on an aircraft derived from direct broadcast satellites, said system comprising:

a video and audio distribution system disposed on the aircraft for distributing video signals to the passengers on the aircraft;

an antenna that comprises steering means for steering the antenna toward the satellite in response to control signals supplied thereto;

antenna control means for providing the control signals to the antenna and for processing status signals derived from the antenna to steer the antenna so that it is locked onto RF signals transmitted by the satellite, and for downconverting the RF signals to provide left hand and right hand circularly polarized RF signals that correspond to a plurality of television channels; and a receiver/decoder coupled to the antenna control means for processing the downconverted RF signals to provide video signals corresponding to the plurality of television channels, and for feeding back the status signals to the antenna control means which are used to steer the antenna to lock it onto the RF signals received from the satellite, and for outputting the video signals to the video and audio distribution system which distributes live television programming to the passengers.

2. The system of claim 1 wherein the antenna control means comprises:

an antenna controller coupled to the receiver/decoder for processing status signals derived therefrom; and an antenna interface unit coupled between the antenna and the receiver decoder for downconverting the RF signals to provide the left hand and right hand circularly polarized RF signals that contain different sets of television channels, and coupled between the antenna controller and the antenna for coupling the control and status signals therebetween.

3. The system of claim 2 wherein the antenna controller comprises:

a controller;

an RS485 interface coupled between the controller and the antenna interface unit for coupling the control and status signals to the controller; and an ARINC 429 interface coupled between the controller and a navigation system for coupling inertial reference signals provided by the navigation system to the controller which are used to generate steering signals that steer the antenna toward the satellite.

4. The system of claim 2 wherein the antenna interface unit comprises:

a downconverter for downconverting the RF signals received from the antenna and for outputting the downconverted RF signals to the receiver/decoder;

a servo controller coupled between the RS485 interface of the antenna controller and the antenna for processing antenna position signals to generate elevation motor drive signals that are supplied to the antenna, and for outputting azimuth control signals;

a servo power amplifier coupled between the servo controller and the antenna for supplying power to the antenna, and for processing motor position control signals derived from the antenna and the azimuth control signals derived from the servo controller to generate azimuth motor drive signals that are supplied to the antenna.

5. The system of claim 1 wherein the receiver/decoder comprises:

a passive mother board having first and second computer busses;

a receiver/decoder card coupled to the first computer bus;

a computer processor coupled to the first computer bus;

a rotary switch coupled to the computer processor for selecting channels for viewing; and a flash disk card coupled to the second bus for storing video, audio and control signals.

6. A satellite television system that provides a single channel of live television programming to overhead monitors mounted throughout an aircraft derived from direct broadcast satellites, said system comprising:

a video and audio distribution system disposed on the aircraft for distributing video signals to the passengers on the aircraft on overhead monitors mounted throughout the aircraft;

an antenna that is disposed adjacent a surface of the aircraft and that comprises steering means for steering the antenna toward the satellite in response to control signals supplied thereto;

antenna control means for providing the control signals to the antenna and for processing status signals derived from the antenna to steer the antenna so that it is locked onto RF signals transmitted by the satellite, and for downconverting the RF signals to provide left hand and right hand circularly polarized RF signals that correspond to a plurality of television channels; and a receiver/decoder coupled to the antenna control means for processing the downconverted RF signals to provide video signals corresponding to the plurality of television channels, and for feeding back the status signals to the antenna control means which are used to steer the antenna to lock it onto the RF signals received from the satellite, and for outputting the video signals corresponding to a single television channel to the video and audio distribution system which distributes live television programming corresponding to the single television channel to the overhead monitors mounted throughout the aircraft.

7. The system of claim 6 wherein the antenna control means comprises:

an antenna controller coupled to the receiver/decoder for processing status signals derived therefrom; and an antenna interface unit coupled between the antenna and the receiver decoder for downconverting the RF signals to provide the left hand and right hand circularly polarized RF signals that contain different sets of television channels, and coupled between the antenna controller and the antenna for coupling the control and status signals therebetween.

8. The system of claim 7 wherein the antenna controller comprises: a controller;

an RS485 interface coupled between the controller and the antenna interface unit for coupling the control and status signals to the controller; and an ARINC 429 interface coupled between the controller and a navigation system for coupling inertial reference signals provided by the navigation system to the controller which are used to generate steering signals that steer the antenna toward the satellite.

9. The system of claim 8 wherein the antenna interface unit comprises:

a downconverter for downconverting the RF signals received from the antenna and for outputting the downconverted RF signals to the receiver/decoder;

a servo controller coupled between the RS485 interface of the antenna controller and the antenna for processing antenna position signals to generate elevation motor drive signals that are supplied to the antenna, and for outputting azimuth control signals;

a servo power amplifier coupled between the servo controller and the antenna for supplying power to the antenna, and for processing motor position control signals derived from the antenna and the azimuth control signals derived from the servo controller to generate azimuth motor drive signals that are supplied to the antenna.

10. The system of claim 6 wherein the receiver/decoder comprises:

a passive mother board having first and second computer busses;

a receiver/decoder card coupled to the first computer bus that decodes video signals corresponding to the single television channel;

a computer processor coupled to the first computer bus; and a flash disk card coupled to the second bus for storing video, audio and control signals.

11. A satellite television system that provides live television programming to passengers on an aircraft derived from direct broadcast satellites, said system comprising:

a video and audio distribution system disposed on the aircraft for distributing video signals to the passengers on the aircraft;

an antenna that comprises steering means for steering the antenna toward the satellite in response to control signals supplied thereto;

antenna control means comprising:

an antenna interface unit coupled to the antenna for downconverting RF signals to provide left hand and right hand circularly polarized RF signals that contain different sets of television channels; and an antenna controller comprising a controller, an RS485 interface coupled between the controller and the antenna interface unit for coupling control signals to the antenna and for processing status signals derived from the antenna to steer the antenna so that it is locked onto RF signals transmitted by the satellite, and an ARINC 429 interface coupled between the controller and a navigation system for coupling inertial reference signals provided by the navigation system to the controller which are used to generate steering signals that steer the antenna toward the satellite; and a receiver/decoder coupled to the antenna interface unit for processing the downconverted RF signals to provide video signals corresponding to the plurality of television channels, and for feeding back the status signals to the antenna controller which are used to steer the antenna to lock it onto the RF signals received from the satellite, and for outputting the video signals to the video and audio distribution system which distributes live television programming to the passengers.

12. The system of claim 11 wherein the antenna interface unit comprises:

a downconverter for downconverting the RF signals received from the antenna and for outputting the downconverted RF signals to the receiver/decoder;

a servo controller coupled between the RS485 interface of the antenna controller and the antenna for processing antenna position signals to generate elevation motor drive signals that are supplied to the antenna, and for outputting azimuth control signals;

a servo power amplifier coupled between the servo controller and the antenna for supplying power to the antenna, and for processing motor position control signals derived from the antenna and the azimuth control signals derived from the servo controller to generate azimuth motor drive signals that are supplied to the antenna.

13. A satellite television system that provides a single channel of live television programming to overhead monitors mounted throughout an aircraft derived from direct broadcast satellites, said system comprising:

a video and audio distribution system disposed on the aircraft for distributing video signals to the passengers on the aircraft on overhead monitors mounted throughout the aircraft;

an antenna that is disposed adjacent a surface of the aircraft and that comprises steering means for steering the antenna toward the satellite in response to control signals supplied thereto;

antenna control means comprising:

an antenna interface unit coupled to the antenna for downconverting RF signals to provide left hand and right hand circularly polarized RF signals that contain different sets of television channels; and an antenna controller comprising a controller, an RS485 interface coupled between the controller and the antenna interface unit for coupling control signals to the antenna and for processing status signals derived from the antenna to steer the antenna so that it is locked onto RF signals transmitted by the satellite, and an ARINC 429 interface coupled between the controller and a navigation system for coupling inertial reference signals provided by the navigation system to the controller which are used to generate steering signals that steer the antenna toward the satellite; and a receiver/decoder coupled to the antenna interface unit for processing the downconverted RF signals to provide video signals corresponding to the plurality of television channels, and for feeding back the status signals to the antenna controller which are used to steer the antenna to lock it onto the RF signals received from the satellite, and for outputting the video signals corresponding to a single television channel to the video and audio distribution system which distributes live television programming corresponding to the single television channel to the overhead monitors mounted throughout the aircraft.

14. The system of claim 13 wherein the antenna interface unit comprises:

a downconverter for downconverting the RF signals received from the antenna and for outputting the downconverted RF signals to the receiver/decoder;

a servo controller coupled between the RS485 interface of the antenna controller and the antenna for processing antenna position signals to generate elevation motor drive signals that are supplied to the antenna, and for outputting azimuth control signals;

a servo power amplifier coupled between the servo controller and the antenna for supplying power to the antenna, and for processing motor position control signals derived from the antenna and the azimuth control signals derived from the servo controller to generate azimuth motor drive signals that are supplied to the antenna.

* * * * *